UNITED STATES PATENT OFFICE.

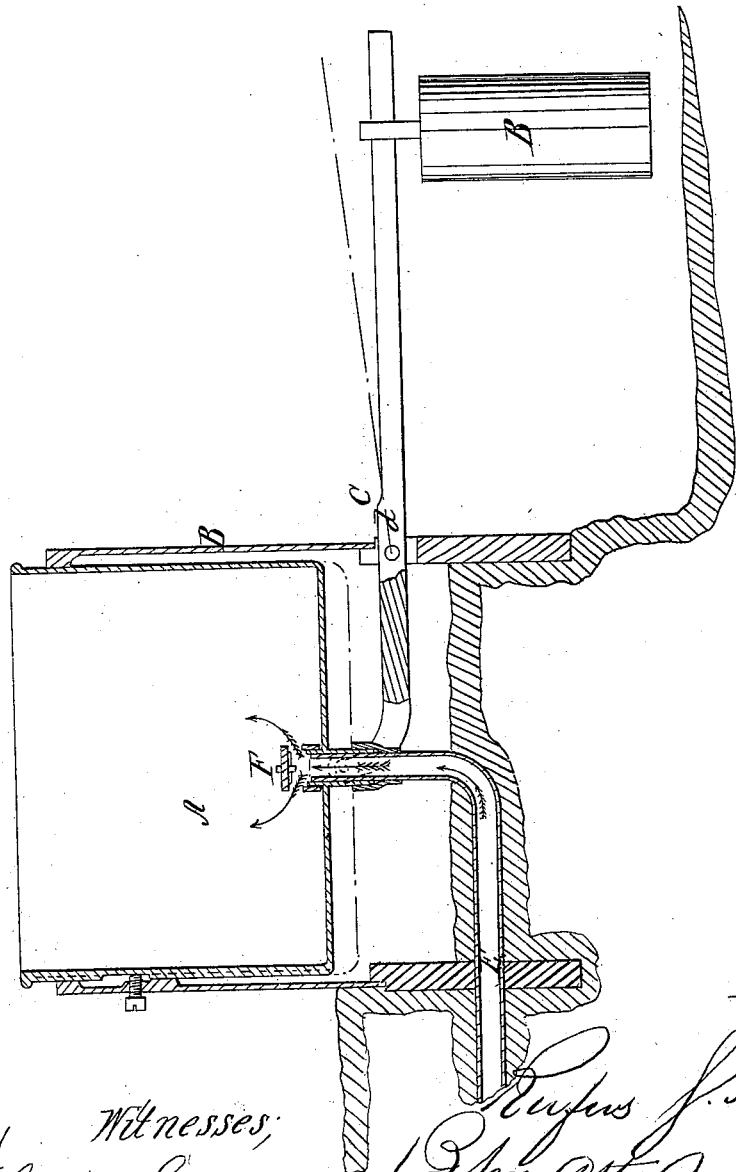

RUFUS S. PICKETT, OF NEW HAVEN, CONNECTICUT.

IMPROVEMENT IN SELF-FEEDING WATER-TANKS.

Specification forming part of Letters Patent No. 54,009, dated April 17, 1866.

*To all whom it may concern:*

Be it known that I, RUFUS S. PICKETT, of New Haven, in the county of New Haven and State of Connecticut, have invented a new and useful Improvement in Self-Feeding Water-Tanks; and I do hereby declare the following, when taken in connection with the accompanying drawings and the letters of reference marked thereon, to be a full, clear, and exact description of the same, and which said drawings constitute part of this specification, and represent, in Figure 1, a central vertical section.

My invention is designed to operate so that when a certain quantity or weight of water shall have passed into a tank the weight of the water will cut off the supply, and when the weight is reduced again open the supply, whereby the tank is always filled to a certain given point.

To enable others skilled in the art to construct and use my improvement, I will proceed to fully describe the same as illustrated in the accompanying drawings.

A is the water-tank, supported by guides B and resting upon a lever, C, the said lever having its fulcrum at *d*, and upon its other arm is suspended a weight, D.

E is a supply-pipe, water passing therethrough into the tank, as denoted by arrows, the said pipe E passing through a stuffing-box at the bottom of the tank, so that the tank will slide freely up or down on the said tube.

When a sufficient quantity of water has passed into the tank to overcome the weight D, then the tank will fall down to the position denoted in red, and the upper end of the pipe be closed by the valve F in the bottom of the tank.

The weight D may be adjusted to vary the quantity of water, which will thus operate to move the tank. The tank will remain down and the pipe closed until a portion of the water in the tank has been removed; then the weight D will cause the tank to rise and admit more water to counterbalance the weight D and again close the pipe as before.

I have described my improvent as constructed so that the tank itself moves to close the valve. In small tanks, as for watering purposes, this doubtless is the better plan; but in large tanks I place a smaller tank arranged similarly to the tank A, so that when the water in the large tank shall have risen so that the water within the tank A shall be of sufficient weight to close the pipe it will operate in like manner as herein described.

Having therefore thus fully described my invention, what I claim as new and useful, and desire to secure by Letters Patent, is—

The combination of the tank A, weight D, or its equivalent, and inlet-pipe E, constructed and arranged to operate in the manner substantially as herein set forth.

RUFUS S. PICKETT.

Witnesses:
JOHN E. EARLE,
M. A. HINE.